Patented Apr. 26, 1932

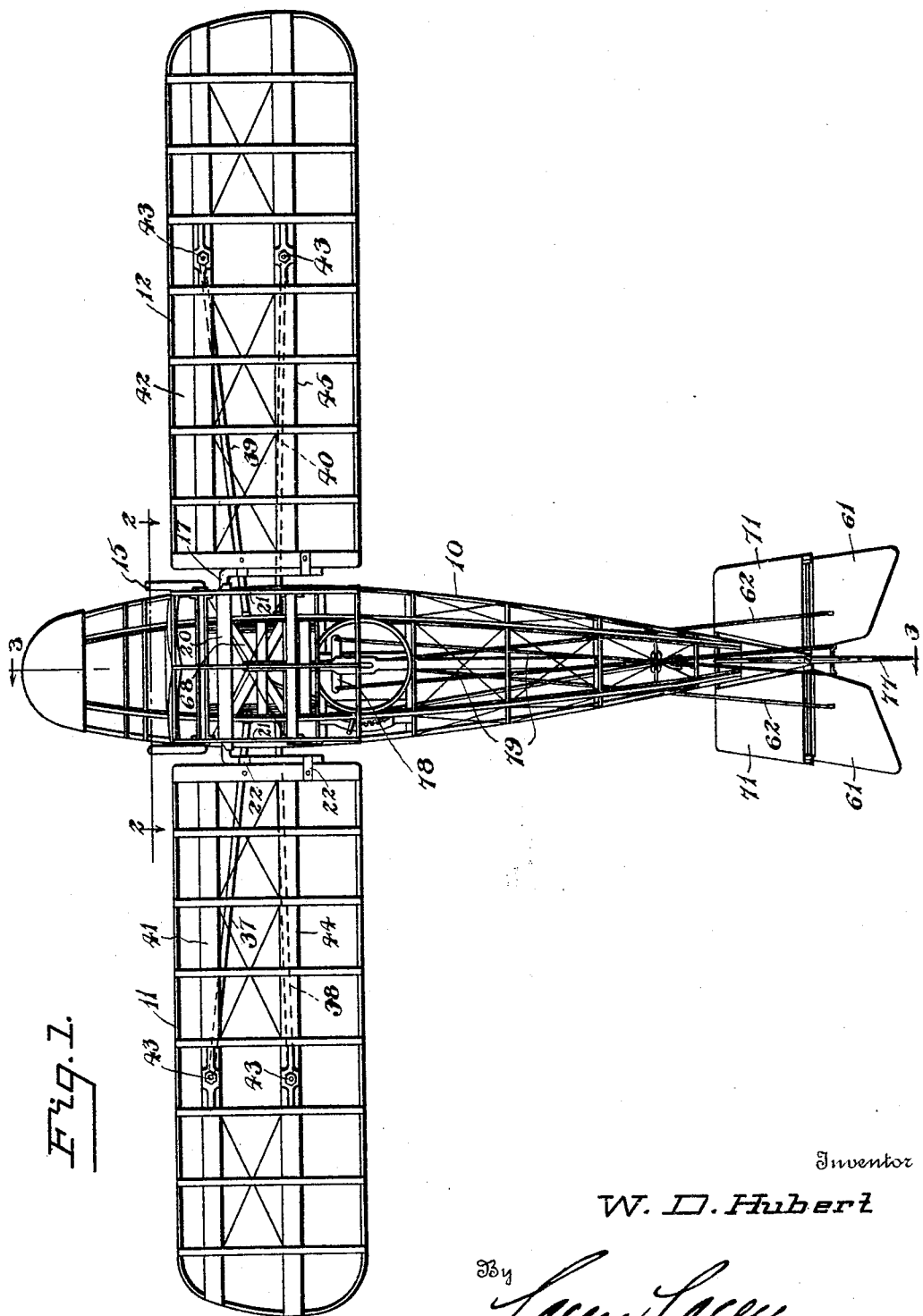

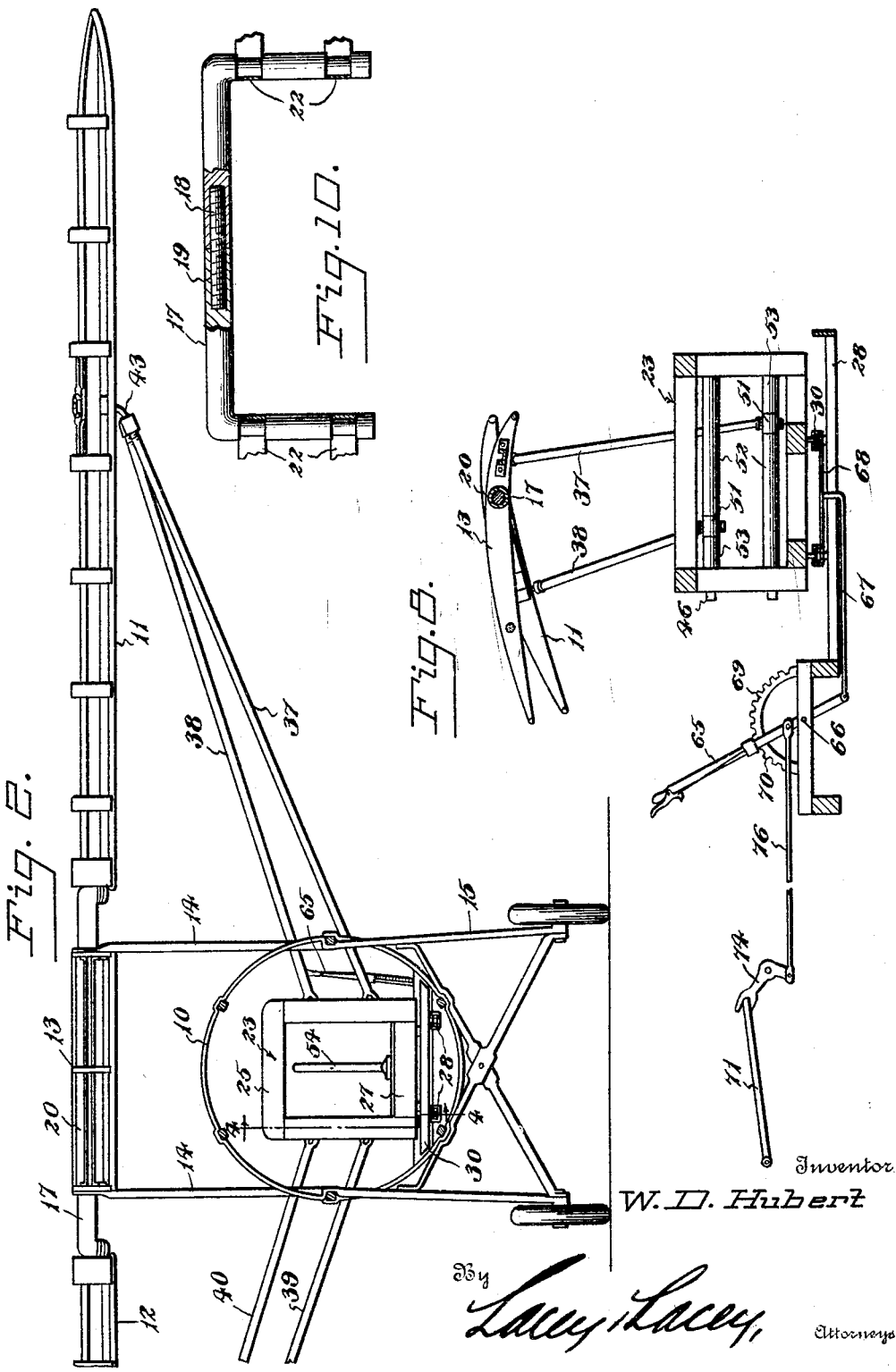

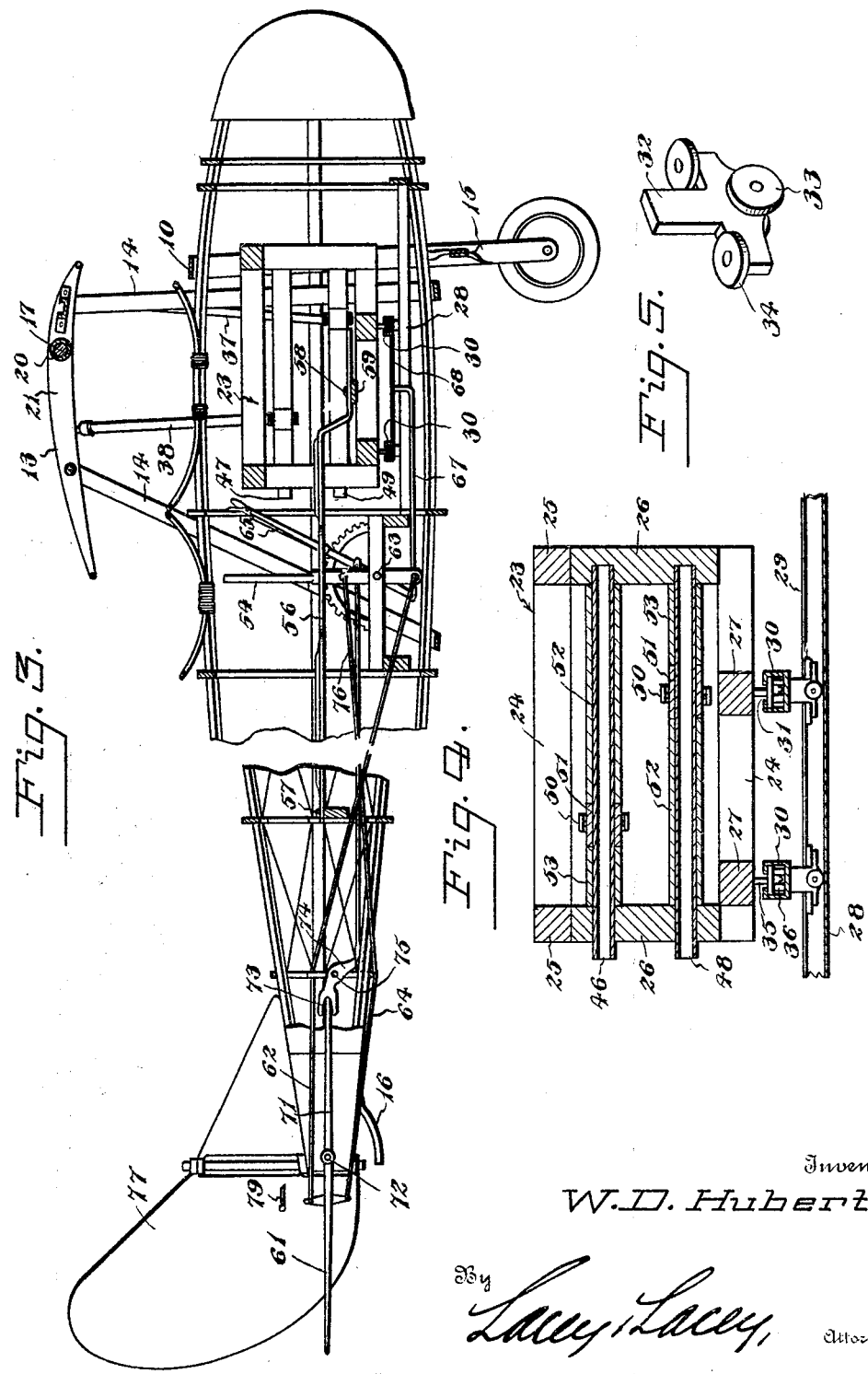

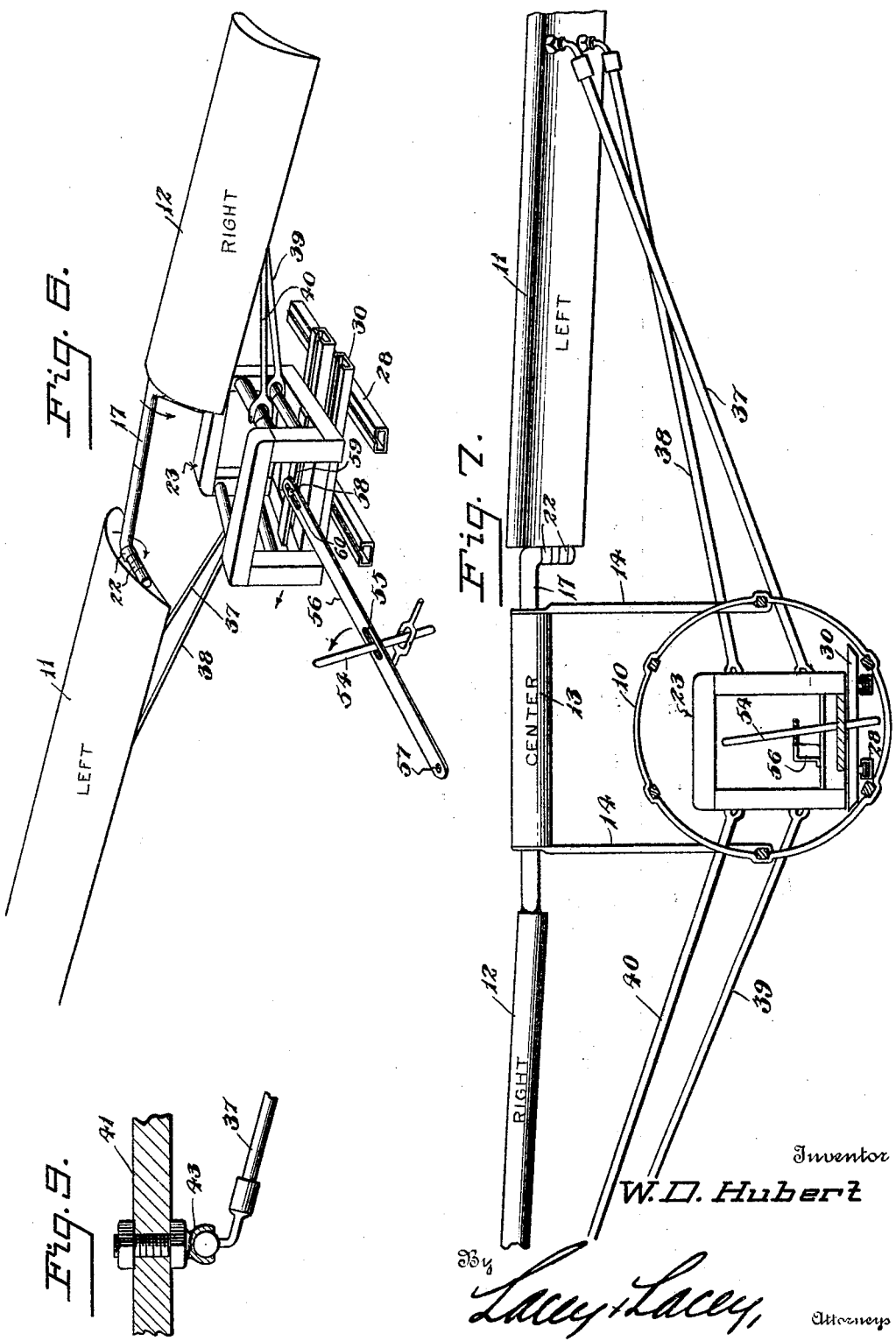

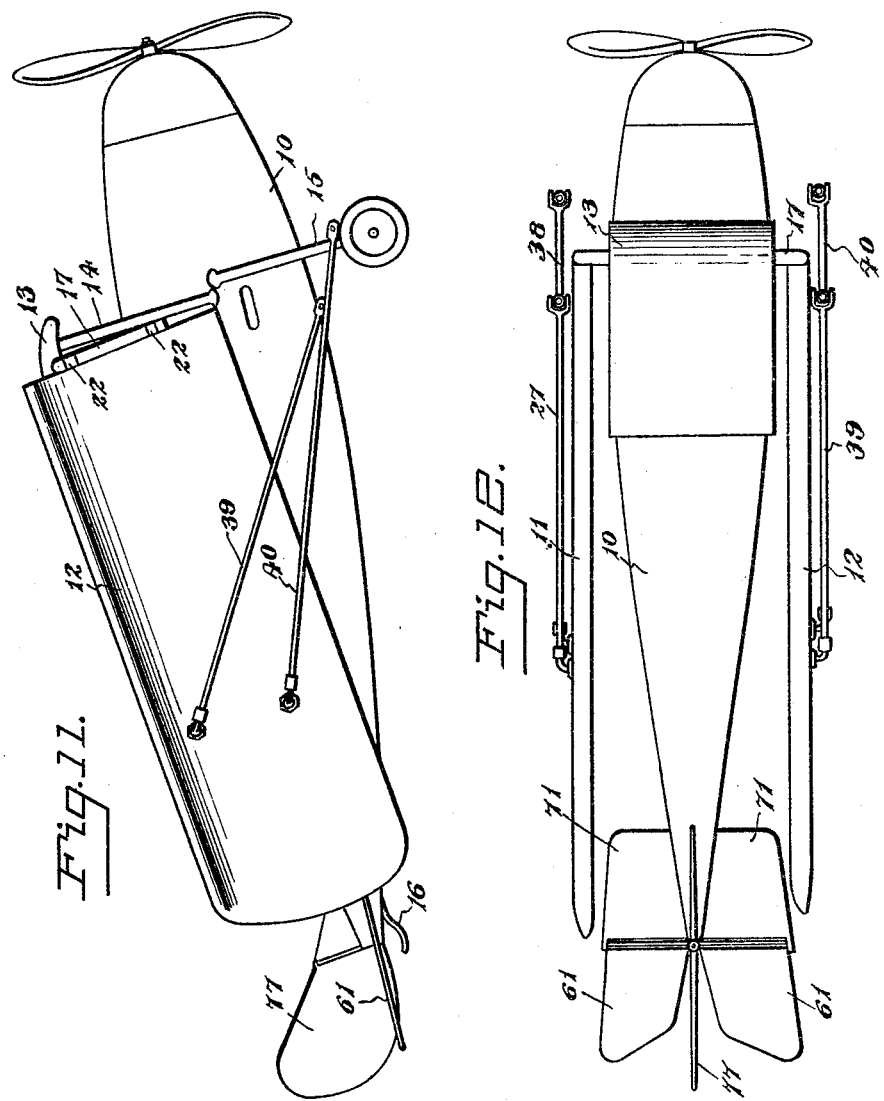

1,855,574

UNITED STATES PATENT OFFICE

WILLIAM D. HUBERT, OF CHICAGO HEIGHTS, ILLINOIS

AIRPLANE

Application filed September 17, 1930. Serial No. 482,624.

This invention relates to airplanes and has for an object to provide airplane wings and operating means therefor to selectively vary the angle of incidence of either wing reversely to the other as well as vary the angle of incidence of both wings identically.

A further object of the invention is to provide wings, the angle of incidence of which may be varied in flight while simultaneously therewith the angle of incidence of the horizontal stabilizer may be varied.

A still further object is to provide a novel swivel connection between the right and left wings of an airplane whereby each wing will be self-balancing, that is, will swivel itself automatically to expose the proper amount of under surface to the head wind in flight so that inequalities built into the wing during manufacture will not affect the stability of the ship.

A still further object of the invention is to provide a novel cage and means for shifting the same longitudinally and laterally of the axis of the fuselage, in combination with a pair of struts connected to each side of the cage and to the front and rear spars of each wing whereby movement of the cage laterally will raise one wing and lower the opposite wing to facilitate banking, while movement longitudinally of the cage will change the angle of incidence of both wings to the same degree to facilitate climbing or diving, these two adjustments of the cage resulting in greater maneuverability than possible with rigid wing construction and ailerons.

A still further object of the invention is to provide novel longitudinal and transverse tracks for securely mounting the cage in the fuselage whereby displacement, due to strains or vibration on the parts, will be reduced to an unavoidable minimum.

A still further object is to provide in addition to the usual control stick, a separate incidence lever which is operatively connected by suitable links to the cage and to the horizontal stabilizer for associating the wings and the stabilizer for movement as a unit.

A still further object is to provide demountable shafts for the wing controlling struts whereby removal of the shafts permits of detachment of the struts from the cage to permit of the wings being folded back along the sides of the fuselage so as to economize hanger space.

With the above and other objects in view, the invention consists in certain novel details of construction and combination of parts hereinafter fully described and claimed, it being understood that various modifications may be resorted to within the scope of the appended claims without departing from the spirit thereof or sacrificing any of the advantages of the invention.

In the accompanying drawings forming part of this specification,

Figure 1 is a top plan view of an airplane constructed in accordance with my invention with the covering of the wings and fuselage removed to expose the details of construction, Figure 2 is a fragmentary sectional view taken on the line 2—2 of Fig. 1 showing the angle of the wings when the controls are centered, Fig. 3 is a longitudinal sectional view taken on the line 3—3 of Fig. 1, Fig. 4 is a longitudinal sectional view taken on the line 4—4 of Fig. 2 showing the removable shafts for the struts and the tracks for the cage, Fig. 5 is a detail perspective view showing one of the trucks for slidably securing the cage to the longitudinal and to the transverse tracks, Fig. 6 is a detail perspective view showing the cage shifted to the left whereby the angle of incidence of the left wing is decreased and the angle of incidence of the right wing increased to facilitate banking to the left.

Fig. 7 is a sectional view similar to Fig. 2 but showing the control stick shifted to the right to increase the angle of incidence of the left wing and decrease the angle of incidence of the right wing to facilitate banking to the right.

Fig. 8 is a fragmentary longitudinal sectional view showing the angle of incidence of the horizontal stabilizer and wings assumed when the incidence lever is pulled back to climb.

Fig. 9 is a detail sectional view showing the ball and socket connection between the outer end of each strut and the wing spar, Fig. 10 is a detail plan view of the common swivel connecting shaft between the right and left wings, broken away to expose the screw joint thereof.

Fig. 11 is a side elevation showing the wings folded, and

Fig. 12 is a plan view showing the wings folded.

Referring now to the drawings in which like characters of reference designate similar parts in the various views, 10 designates the fuselage, 11 the left wing, 12 the right wing, and 13 the rigid center wing section, which latter, in the present embodiment of the invention, is shown as rigidly attached to the fuselage by braces 14, best shown in Figs. 2 and 3. The wing covers and fuselage covers are not illustrated so that the details of construction may be more clearly seen. The fuselage is, as usual, supported at the front by an under carriage 15 and at the rear by a tail skid 16, and the framework of the fuselage may be constructed in accordance with the usual practice, as also may the wings, with the exception of such modifications hereinafter described and comprising my improvements.

Referring now to Fig. 10, a substantially U-shaped swivel shaft 17 is provided comprising two identical sections, one of which is cored out at the end to rigidly receive a screw 18, the free end of which enters a threaded axial bore 19 in the opposite section. As a result, both sections of the shaft may swivel independently of each other. This shaft forms means for mounting the left and right wings 11 and 12 on the center wing section 13.

To effect said mounting of the wings, the reach of the shaft is passed transversely through the center wing section, as shown in Fig. 3, and is surrounded by a sleeve 20 which is rigidly secured in any preferred manner to the ribs 21 of said section. The sleeve forms a bearing in which the shaft may be rocked, as will presently appear. The legs of the shaft are pivotally secured to the inner ends of the right and left wings by straps 22 to permit of the wings being folded back against the fuselage. The screw 18 permits of the right and left legs of the U-shaped shaft swiveling relatively to each other to permit of the right and left wings swiveling independently of each other to permit of the proper amount of under surface thereof being exposed to the head wind in flight to compensate for inequalities, such as variations in length, etc., built into the wing structure during manufacture. The screw also permits of the legs of the shaft swiveling in the sleeve in unison or independently of each other to permit of manipulation of the wings, as hereinafter fully described.

The shiftable cage 23 for changing the angle of incidence of, as well as banking the wings, may be constructed in any preferred manner, but for the purpose of illustration, the same is herein shown as formed of wood. The cage comprises, as shown best in Fig. 4, upper and lower longitudinal bars 24, transverse bars 25 connecting the upper ends of the upper longitudinal bars, front and rear vertical bars 26, and transverse sills 27, which latter form means of supporting the cage on the tracks within the fuselage, as will now be described.

Secured in any preferred manner longitudinally of the fuselage is a longitudinal track formed of square hollow rails 28, these rails having slots 29 at the top, as best shown in Figure 4. Extending transversely of the track is a second track formed of similar hollow square rails 30, which likewise are provided at the top with slots 31. Trucks, as best shown in Fig. 5 and designated by the numeral 32 in general, are rigidly secured to the bottoms of the rails 30 and enter the slots 29 of the rails 28. These trucks are provided with vertical casters 33 which ride within the longitudinal track rails 29 and are also provided with horizontal casters 34 which ride within said rails and slidably secure the cross track rails 30 for movement longitudinally of the fuselage with minimum friction.

The above mentioned sills 27 are provided also with trucks, designated in general by the numeral 35, which enter the longitudinal slots 31 of the transverse rails 30 and are equipped with vertical casters 36 which ride within the hollow rails and slidably secure the cage to the rails 30 for movement transversely of the fuselage with minimum friction.

The longitudinally and laterally shiftable cage is operatively connected to the left wing by front and rear inclined struts 37 and 38 and to the right wing by similar front and rear inclined struts 39 and 40. The struts are preferably formed of light metal tubing.

As best shown in Fig. 1, the outer ends of the front struts 37 and 39 are connected to the front spars 41 and 42 of the left and right wings by ball and socket connectors, one of which is shown in detail at 43 in Figure 9. Identical ball and socket connectors connect the outer ends of the rear struts 38 and 40 to the rear spars 44 and 45.

The rear left and right struts 38 and 40 are pivotally connected to parallel longitudinal shafts 46 and 47 in the cage. Likewise, the inner ends of the front left and right struts are pivotally connected to parallel shafts 48 and 49, these shafts being best shown in Figs. 3 and 4 and being preferably formed of light tubing. It will be seen that the shafts 46 and 48 on the left side of the cage are located one above the other and the same is true of the shafts 47 and 49 on the right side of the cage. As best shown in Fig. 8, each strut is forked at the inner end, and as shown in Fig. 4, pins 50 are passed through the branches of the fork and into a sleeve 51 which is loosely mounted on the corresponding shaft. Spacing sleeves 52 and 53 surround the shaft on opposite sides of the sleeve 51. It will be here pointed out that the shafts are all removable rearwardly from the cage to permit of the inner ends of the struts being detached from the cage and facilitate folding of the wings, as will be later described.

When the cage is centered in the fuselage, the parts are in the position shown in Figs. 1, 2 and 3 and in this position of the parts, the angle of incidence of the right and left wings is normal, that is, coincides with the angle of incidence of the rigid center wing section. When the pilot shifts the cage to the left, as shown diagrammatically in Fig. 6, the struts 37 and 38 decrease the angle of incidence of the left wing and the opposite struts 39 and 40 increase the angle of incidence of the right wing, thereby tilting or banking the ship to the left. The legs of the U-shaped shaft 17 turn oppositely to each other in the sleeve 20 during this movement of the wings. Conversely, when the pilot shifts the cage to the right, said struts operate to change the angle of incidence of the wings to lift the left wing and lower the right wing whereby to bank the plane to the right.

More specifically, to effect banking of the wings, it may be seen that the angle of incidence of both wings is reversed with respect to each other so that one wing will function with a decreased angle of incidence and the other will climb due to the increased angle of incidence. To better illustrate the effect of the increased and decreased angle of incidence on a plane wing, I will give an example. A wing at a 5 degree angle of incidence traveling at 40 miles per hour will have a 0.18 lift and, tilted at an angle of incidence of 15 degrees traveling at the same speed, will have a 0.48 lift, so the slightest change in the angle of incidence will tilt or bank the plane without causing any noticeable resistance or brake either way.

This reversal of the angle of incidence is accomplished by virtue of the front strut being set at a more oblique angle to the major axis of each wing than is the rear strut. As a result, when the cage is moved to the left, for instance, the rear of the left wing is moved upward faster than the front of the wing thereby flattening the wing which decreases the angle of incidence of the left wing. Simultaneously, the rear of the right wing is lowered faster than the front thereof thereby increasing the angle of incidence of the right wing.

The same result in the yaw, or that action of the wings produced by moving the stick (cage) sidewise, may be effected by removing the rear struts from the upper shafts, connecting the same with the same shafts that the front struts are connected to, making them longer, and fastening them to the rear spars nearer the tips of the wings than shown in the drawings. In any event, it is merely necessary to maintain the front and rear struts of each wing at an angle with respect to each other, that is, at different angles to the major axis of the corresponding wing, to accomplish the result of reversing the angle of incidence of both wings relatively to each other simultaneously when the cage is shifted laterally.

For manipulating the cage to the right or left, the control stick 54 is passed through a longitudinal slot 55 in a beam or long link 56 which is pivoted at the rear end, as shown at 57, in any preferred manner to the tail of the fuselage and is slidably and pivotally connected to the cage, as best shown in Fig. 6, by means of a pivot pin 58 carried by a cross bar 59 of the cage and passed through a longitudinal slot 60 formed in the front end of the link. By shifting the stick to the left, the link is swung to the left and moves the cage in a corresponding direction. By shifting the stick to the right, a reverse movement of the parts takes place. The longitudinal slot 55 in the link permits of the stick being shifted forwardly or backwardly to manipulate the elevator flaps 61. The longitudinal slot 60 permits of the cage being shifted forwardly and rearwardly by the hereinafter described incidence lever without disturbing the control stick.

For operating the elevator flaps, the upper control wires 62 of the elevator flaps 61 are connected to the stick, as shown in Fig. 3, below the pivot 63 thereof, while the lower control wires 64 of the flaps are connected to the stick above the pivot thereof. Consequently, when the stick is thrust forward, the flaps are pulled down to elevate the tail, and when the stick is pulled rearwardly, the flaps are pulled up to depress the tail. This is the usual standard practice of stick operation. When the hereinafter described incidence lever is pulled back to change the angle of incidence of both wings to a greater angle attack, the control stick may be pulled back in unison therewith to elevate the tail flaps thereby depressing the tail and producing greater flexibility in climbing, or vice versa.

In order to change the angle of incidence of both wings to the same degree, the cage is moved forwardly or rearwardly longitudinally of the fuselage by means of an incidence lever 65 which is pivoted to the fuselage, as shown at 66 in Fig. 8. A link 67 connects the lever below the pivot thereof to an X-shaped brace 68, shown in plan in Fig. 1 and in elevation in Fig. 3, which brace is rigidly secured to the cage. Forward movement of the lever will consequently shift the cage rearwardly whereby the angle of incidence of both wings is made less or the wings are flattened out to the same degree. Conversely, rearward movement of the incidence lever past a central position moves the cage bodily forwardly to increase the angle of incidence of both wings to the same degree. The incidence lever is held in any adjusted position by means of a rack 69 and a dog 70 of usual construction.

The action of the struts in changing the angle of incidence of the wings in unison as the cage is shifted forward or backward is as follows. The pivoted inner ends of the struts are carried forward as the cage is shifted forward. The outer ends of the struts swivel on the wings during this forward movement of the inner ends of the struts. Consequently, during forward movement of the inner ends of the struts the rear struts will pull the trailing edges of the wings downward simultaneously, while the front struts will push the leading edges of the wings upward simultaneously. Conversely, the angle of incidence is decreased as the cage moves backward.

The center of the wind pressure on each wing is located about one-third of the width of the wing from the leading edges thereof, and as the angle of incidence increases, the center of pressure moves forward thereby throwing the airplane slightly out of balance by tilting the nose up and the tail down. To counteract this instability, the horizontal stabilizer 71 is pivoted at the rear end as shown at 72 to the tail structure of the fuselage. The front edge of the stabilizer is grasped by the forked end 73 of a bell crank lever 74 which is pivoted, as shown at 75 in Fig. 3, to the tail structure of the fuselage. A connecting link 76 connects the bell crank lever with the incidence lever 65 above the pivot 66 thereof, as best shown in Fig. 8. When the incidence lever is pulled backward to increase the angle of incidence of the wings, it will consequently move the connecting link 76 rearwardly whereby the bell crank lever 74 is rocked to tilt the horizontal stabilizer upwardly and increase the angle of incidence of the stabilizer, thereby keeping the plane balanced or maintaining the stability thereof while at the same time increasing the lift.

The rudder and rudder controls of the airship are preferably in accordance with the usual practice, the rudder 77, Figure 1, being connected to the rudder bar 78 by the usual control wires 79. When the rudder bar is kicked forward with the right foot, the rudder will be pulled to the right and vice versa. As above described, the operation of the control stick is also in accordance with standard practice, that is. when the control stick is moved to the right, the right wing will be lowered and the left will be raised. Thus, when the rudder bar is kicked by the right foot and the control stick moved to the right, a right turn will be made since the vertical rudder is turned to the right while the right wing is depressed by its decreased angle of incidence and the left wing elevated by its increased angle of incidence to bank the ship.

By referring now to Figs. 11 and 12, it will be seen that the wings 11 and 12 may be folded back against the sides of the fuselage so that the ship may be stored in a small space. As above mentioned, the shafts 46, 47, 48 and 49 of the cage are removable rearwardly from the cage. When these shafts are removed, the inner ends of all the struts are freed from the cage. When the struts are free, the trailing edge of each wing may be pulled down, the wings rocking freely on the U-shaped shaft 17 as a pivot. From this vertical position the wings may be brought back to folded position along the sides of the plane by grasping the tips of the wings and carrying the wings bodily rearwardly, the wings swiveling freely on the legs of the shaft 17 by virtue of the strap connections 22 with said legs. The struts may now be folded back along the sides of the plane.

By virtue of the cage being constructed as above described, a seat for a passenger or observer may be suspended in the cage from the fixed center wing section with enough clearance around the seat to allow the cage to be freely moved longitudinally and transversely, as above described.

It will be specifically pointed out that two top wheels 34 of the truck 32 perform an extraordinary duty as they take care of the side strain, especially when the plane dives or banks, thereby keeping the wheels 33 from rubbing the sides of the track which would cause unnecessary friction.

From the above description, it is thought that the construction and operation of the invention will be clearly understood without further description.

Having thus described the invention, I claim:

1. In an airplane, right and left wings, a fixed center wing, and a substantially U-shaped shaft having the reach thereof journaled in the center wing and having the legs thereof operatively connected to the inner ends of the right and left wings, said shaft being provided in the reach thereof with a swivel joint whereby said right and left wings may swivel independently of each other on said shaft as an axis.

2. In an airplane, right and left wings, a fixed center wing, a substantially U-shaped shaft having the reach thereof journaled in said center wing and having the legs operatively connected to said right and left wings, said reach being formed of two sections, and a screw carried by one of said sections engaging in a threaded bore in the other of said sections and permitting of said right and left wings swiveling independently of each other on said shaft as an axis.

3. In an airplane, right and left wings, a fixed center wing, a transverse sleeve carried by said fixed center wing, a substantially U-shaped shaft having the reach thereof journaled in said sleeve and having the legs thereof extending beyond the sleeve, pivotal connections between said legs and the inner ends of said right and left wings permitting of said wings being swung upon said legs as an axis to folded position, said reach being formed of separate sections, and a swivel connection between said sections permitting of said right and left wings swiveling independently of each other on said shaft as an axis.

4. In an airplane, wings, a fuselage, a cage shiftable longitudinally and laterally of the fuselage, and a pair of struts carried by each wing and pivoted to the sides of the cage for changing the position of the wings when the cage is shifted.

5. In an airplane, right and left wings, a fuselage, a cage shiftable laterally of the fuselage, a pair of inclined struts connecting the right wing to the cage, and a second pair of inclined struts connecting the left wing to the cage, the struts of each pair of struts being disposed at an angle to each other whereby lateral shifting of the cage simultaneously banks the wings and changes the angle of incidence thereof.

6. In an airplane, right and left wings, a fuselage, a cage shiftable longitudinally of the fuselage, a pair of struts carried by the right wing and connected to the corresponding side of the cage, and a pair of struts carried by the left wing and connected to the corresponding side of the cage, movement of the cage longitudinally moving the inner ends of the struts longitudinally whereby the struts operate to change the angle of incidence of both wings to an equal degree.

7. In an airplane, right and left wings, a fuselage, a cage shiftable longitudinally and laterally of the fuselage, a pair of struts swivelly connected to the right wing and pivotally connected to the right side of the cage, the inner ends of said struts being disposed one above the other whereby said struts are positioned at an angle with respect to each other, and struts carried by the left wing and having their inner ends pivoted to the corresponding side of the cage one above the other whereby said struts are disposed at an angle with respect to each other, shifting of the cage laterally moving the struts to simultaneously raise one wing and lower the opposite wing and reverse the angle of incidence of the low wing with respect to the high wing, shifting of the cage longitudinally moving the struts to change the angle of incidence of both wings identically.

8. In an airplane, right and left wings, a fixed center wing, a swivel connection between the right and left wings and the center wing permitting of said wings swiveling independently of each other on said connection as an axis, a cage carried by the fuselage and shiftable within said fuselage, a pair of inclined struts carried by the right wing and pivotally connected to said cage one above the other, a pair of struts carried by the left wing and pivotally connected to said cage one above the other, movement of said cage being transmitted through said struts to said right and left wings to change the angular position thereof with respect to said fixed center wing, a link pivoted at the rear end to said fuselage and pivotally connected to said cage for shifting the cage, and a control stick for moving said link.

9. In an airplane, right and left wings, a fixed center wing, a fuselage, a horizontal stabilizer pivoted at the rear and to said fuselage, a shiftable cage carried by said fuselage, struts operatively connecting the cage to said right and left wings for changing the angle of incidence as said cage is shifted longitudinally of the fuselage, an incidence lever, and means connecting the incidence lever with the cage and with the free front edge of the stabilizer whereby to simultaneously change the angle of incidence of the right and left wings and stabilizer.

10. In an airplane, right and left wings, a fixed center wing, swivel connections between the right and left wings, a fuselage, a pivoted horizontal stabilizer, a longitudinal shiftable cage in the fuselage, struts operatively connecting the right and left wings with the corresponding sides of the cage, movement of the cage longitudinally being transmitted through said struts to swivel said wings on said connections and vary the angle of incidence thereof, an incidence lever, a link connecting said lever to said cage, and a link connecting said lever to the free edge of said stabilizer, movement of said lever being transmitted through said links to said cage and stabilizer whereby the angle of incidence of said wings and said stabilizer is changed as a unit.

11. In an airplane, right and left wings, a center wing, swivel connections between the right and left wings and the center wing, a fuselage, a cage mounted to slide longitudinally in said fuselage, struts connecting said right and left wings to said cage and adapted to swivel said wings on said swivel connections when said cage is shifted longitudinally to change the angle of incidence of the wings, a horizontal stabilizer pivoted at the rear end to the tail of the fuselage, a pivoted incidence lever, and links operatively connecting the cage to the leading edge of the stabilizer whereby movement of said incidence lever to change the angle of incidence of the wings simultaneously changes the angle of incidence of the stabilizer.

12. In an airplane, right and left wings, a fixed center wing, swivel connections between the right and left wings and the center wing, a fuselage, a cage shiftable longitudinally in the fuselage, means connecting the cage to the wings and adapted to swivel the wings on said connections and change the angle of incidence thereof when said cage is shifted, a pivoted horizontal stabilizer, and means operatively connecting said cage and said stabilizer for movement as a unit whereby the angle of incidence of said stabilizer is changed when said cage is shifted.

13. In an airplane, swiveling wings, a fuselage, a cage carried by the fuselage, removable shafts carried by said cage, and struts connected to said shafts and to said wings for moving the swiveling wings as a unit with said cage, removal of said shafts permitting of detachment of said struts whereby said wings may be swiveled and folded back against the sides of the fuselage.

14. In an airplane, right and left wings, a center wing, a substantially U-shaped shaft journaled in the center wing and having the legs extending along the inner ends of the right and left wings, straps carried by said right and left wings and encircling the legs of said shaft whereby said wings may be swung to folded position along the sides of the fuselage on said legs, and detachable struts operatively connecting the wings to the fuselage to normally hold the right and left wings flush with the center wing.

In testimony whereof I affix my signature.

[L. S.]     WILLIAM D. HUBERT.